358-190. XR 3,715,464 SR

United States Patent [19]

Sendelweck

[11] 3,715,464

[45] Feb. 6, 1973

[54] HIGH VOLTAGE HOLD-DOWN CIRCUIT

[75] Inventor: Gene Karl Sendelweck, Indianapolis, Ind.

[73] Assignee: RCA Corporation, New York, N.Y.

[22] Filed: May 28, 1971

[21] Appl. No.: 147,876

[52] U.S. Cl.......................178/5.4 R, 7.3 R, 7.5 R

[51] Int. Cl...............................H04n 9/16, 5/68

[58] Field of Search............................178/7.3 R, 7.3 DC, 7.5 R, 7.5 DC; 315/22; 178/5.4 R

[56] References Cited

UNITED STATES PATENTS

| | | | |
|---|---|---|---|
| 3,270,128 | 8/1966 | Stark Jr. | 315/22 X |
| 3,440,481 | 4/1969 | Rhee et al. | 315/22 |
| 3,427,496 | 2/1969 | Wood | 315/22 X |

*Primary Examiner*—Richard Murray
*Attorneys*—Eugene M. Whitacre, and Charles I. Brodsky

[57] ABSTRACT

Loss of high voltage regulation in a television receiver can cause an increase in the ultor voltage developed for its picture tube and an increase in the possibility of X-radiation. The described circuit senses the loss of such regulation by detecting a voltage pulse developed in the flyback transformer and by changing the bias on the horizontal output tube, in response, so as to form a closed-loop feedback system which maintains normal high voltage operation whenever such regulator circuit failure occurs.

5 Claims, 4 Drawing Figures

INVENTOR
Gene K. Sendelweck
BY Eugene M. Whitacre
ATTORNEY

INVENTOR
Gene K. Sendelweck
BY Eugene M. Whitacre
ATTORNEY

FIELD OF THE INVENTION

This invention relates to color television receivers, in general, and to a circuit arrangement for limiting the high voltage supplied to its picture tube to limit X-radiation, in particular.

SUMMARY OF THE INVENTION

As will become clear hereinafter, the circuit of the present invention senses a particular operating condition in the receiver as indicative of the functioning of the high voltage regulator. During proper functioning of the regulator system, the circuit provides a zero control effect; but, upon detecting a voltage change indicating a malfunction in the regulator, the circuit responds to provide a control signal which changes the bias on the horizontal output tube of the receiver, tending to render it less conductive in a manner resulting in the development of lower high voltages. One preferred embodiment of the invention will be seen to employ a clamp circuit which provides a comparison level against which attempts at high voltage increase can be measured. By using a resistance-capacitance time constant network of greater duration than the horizontal repetition rate together with a coupling resistor of greater resistance value, a peak detector circuit can be formed through the use of an additional capacitive element to provide a bias voltage for the horizontal output tube substantially equal to the peak value of a voltage pulse less a zener diode reference voltage. With this voltage pulse corresponding to regulated flyback pulses developed in the receiver's horizontal transformer, any change thereof beyond a prescribed level will be indicative of failure in the shunt regulator circuit. With the application of the bias voltage to the control grid of the horizontal output tube, any tendency for the voltage pulse to excessively vary will reduce the control grid bias (i.e., go more negative), to reduce the conductivity of the horizontal output tube in a manner to stabilize the high voltage developed. In essence, it will be seen, that this arrangement forms a closed-loop feedback system which holds the high voltage within a limited operating range whenever a failure occurs in the regulator circuit.

BRIEF DESCRIPTION OF THE DRAWINGS

These and other advantages of the present invention will be more clearly understood from a consideration of the following description taken in connection with the accompanying drawings in which.

DETAILED DESCRIPTION OF THE DRAWINGS

Figure 1:
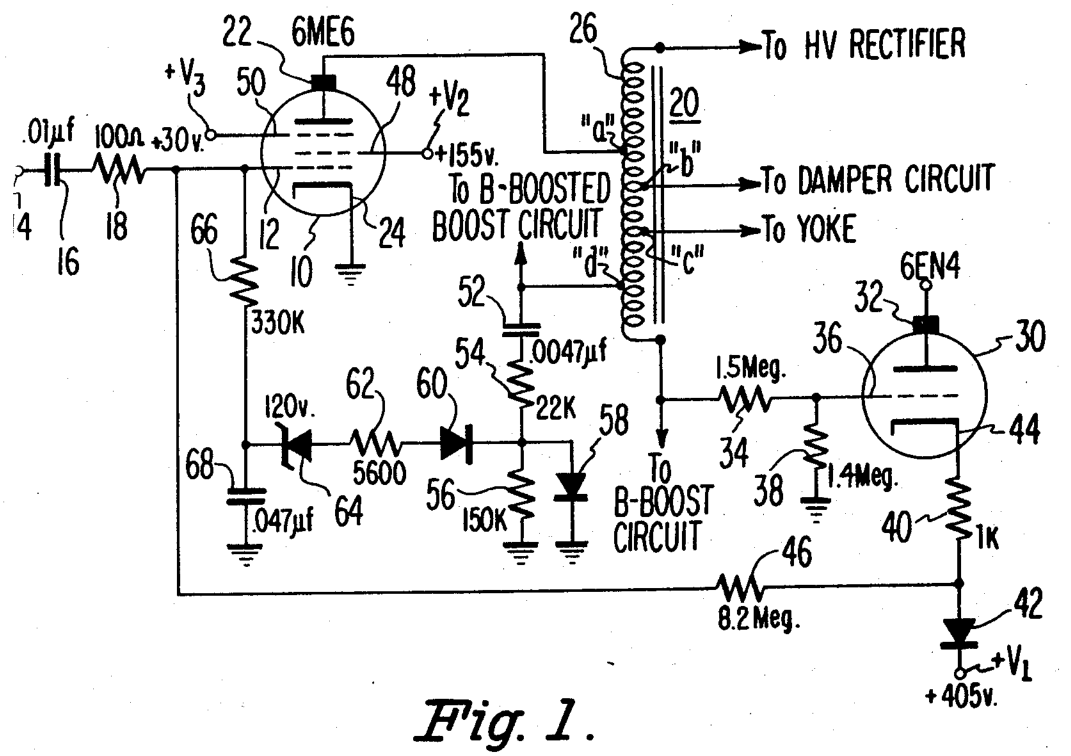
FIG. 1 shows, in schematic form, a horizontal output circuit for a television receiver including a high voltage hold-down circuit in accordance with the invention.

In FIG. 1 of the drawings, the horizontal output tube is represented by the notation 10, and is supplied at its control grid 12 with a suitable deflection voltage of sawtooth waveform. Such deflection signal is more specifically applied to the grid 12 by way of a terminal 14, a capacitor 16 and a resistor 18. A horizontal output transformer 20 is also shown, having a primary winding tap *a* coupled to the anode 22 of the horizontal output tube 10, the cathode 24 of which is directly connected to ground. A high voltage secondary winding 26 of the transformer 20 is arranged for connection to the anode cap of a high voltage rectifier tube (not shown) while primary winding taps *b* and *c* are respectively arranged for connection to the damper circuit of the receiver and to the horizontal deflection winding associated with its picture tube. The low voltage end of transformer 20 is further coupled, as indicated, to an appropriate B-boost circuit. The specific arrangements for connecting the various terminals on transformer 20 to the circuits indicated is more fully illustrated in the pulbication of the RCA Sales Corporation describing its CTC–39 chassis, under the file designation 1970, No. T3.

Also coupled to the low voltage end of the transformer 20 is the shunt regulator circuit for the receiver. As indicated, the regulator circuit includes a triode type vacuum tube 30 having an anode electrode 32 to which the potential developed by the high voltage rectifier is applied. A first resistor 34 couples the grid 36 to the transformer 20, while a second resistor 38 couples grid 36 to ground. A third resistor 40 and a semiconductor rectifier 42 serially couple the cathode 44 of the regulator tube 30 to a source of positive $+V_1$ potential, while a fourth resistor 46 couples their junction to the grid 12 of horizontal output tube 10 to provide a necessary operating bias for the tube from the positive voltage developed by the clamping action of rectifier 42. Such action clamps the right hand end of resistor 46 at substantially the $V_1$ positive value whenever current flows in the regulator tube 30. Because rectifier 42 also serves to prevent the development of this clamping voltage should resistor 40 open-circuit, for example, its presence also insures that the negative voltage applied to the control grid 12 by peak dection (as described below) will be sufficient to bias off the tube 10 under such fault condition.

In operation as so far described, any change in the high voltage applied to the anode 32 of regulator 30 will be reflected in a corresponding change in that portion of the B boost voltage applied to its control grid 36 by the divider action of resistors 34, 38. The increase in current in tube 30 which follows an increase in high voltage thus produces a greater voltage drop across the source impedance of the high voltage rectifier (e.g. in the manner of the RCA publication), to offsettingly lower the increasing high voltage, in response. With the application of a positive potential $+V_2$ to the screen grid 48 of horizontal output tube 10 of greater magnitude than a positive potential $+V_3$ applied to its suppressor grid 50, it will be noted that the arrangement is substantially similar to that illustrated in the afore-mentioned RCA publication.

However, where loss of this stabilization occurs—through a fault in the regulator tube or in its coupling transformer, for example—the ultor voltage could rise to a level at which the impacting high energy electrons of the picture tube could destroy its phosphor face and could create an X-radiation hazard. In accordance with the invention, though, a hold-down circuit is provided to maintain the voltage stabilization even in the presence of a fault introduced into the shunt regulator circuit.

As shown, a capacitor 52 is coupled at one end to a tap *d* on the primary winding of transformer 20 and at its other end to a pair of resistors 54, 56 serially returned to ground. The anode electrode of a rectifier 58 is connected to the junction of these resistors 54, 56, as is the cathode electrode of a further rectifier 60. The cathode electrode of rectifier 58 is in turn grounded, whereas the anode electrode of rectifier 60 is serially coupled by means of a resistor 62, a zener diode 64 and an additional resistor 66 to the grid 12 of horizontal output tube 10. A further capacitor 68 couples the junction of zener diode 64 and resistor 66 to ground. In operation, it will be seen below that direct potentials are developed in this arrangement at the junction of resistor 66 and diode 64, as well as at the junction of resistor 40 and rectifier 42. In addition, voltage waveforms related to the magnitude of the flyback pulse in transformer 20 and at that same repetition rate will be developed at tap *d* of the transformer winding and at the junction of resistor 56 and rectifier 58.

Figure 4:
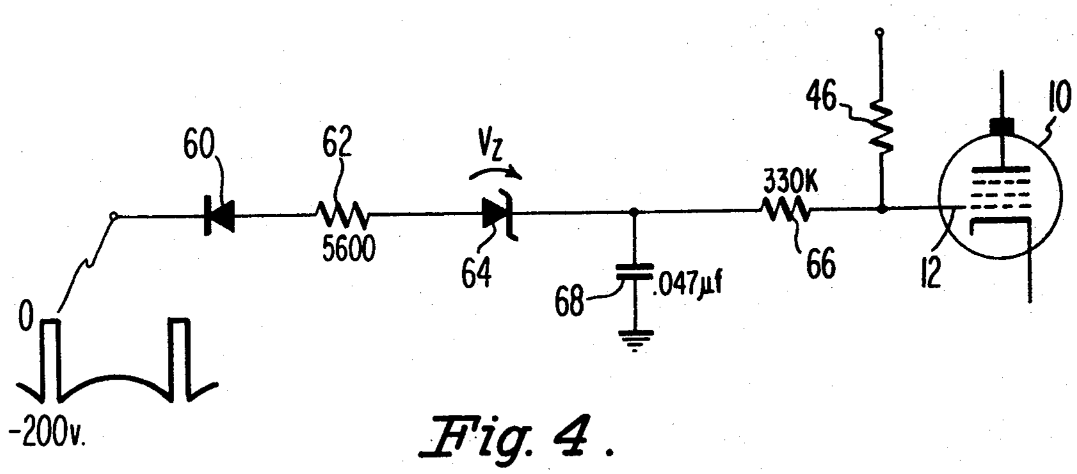
FIG. 4 represents an equivalent control grid bias circuit useful in an understanding of the invention.
Figures 2, 3:
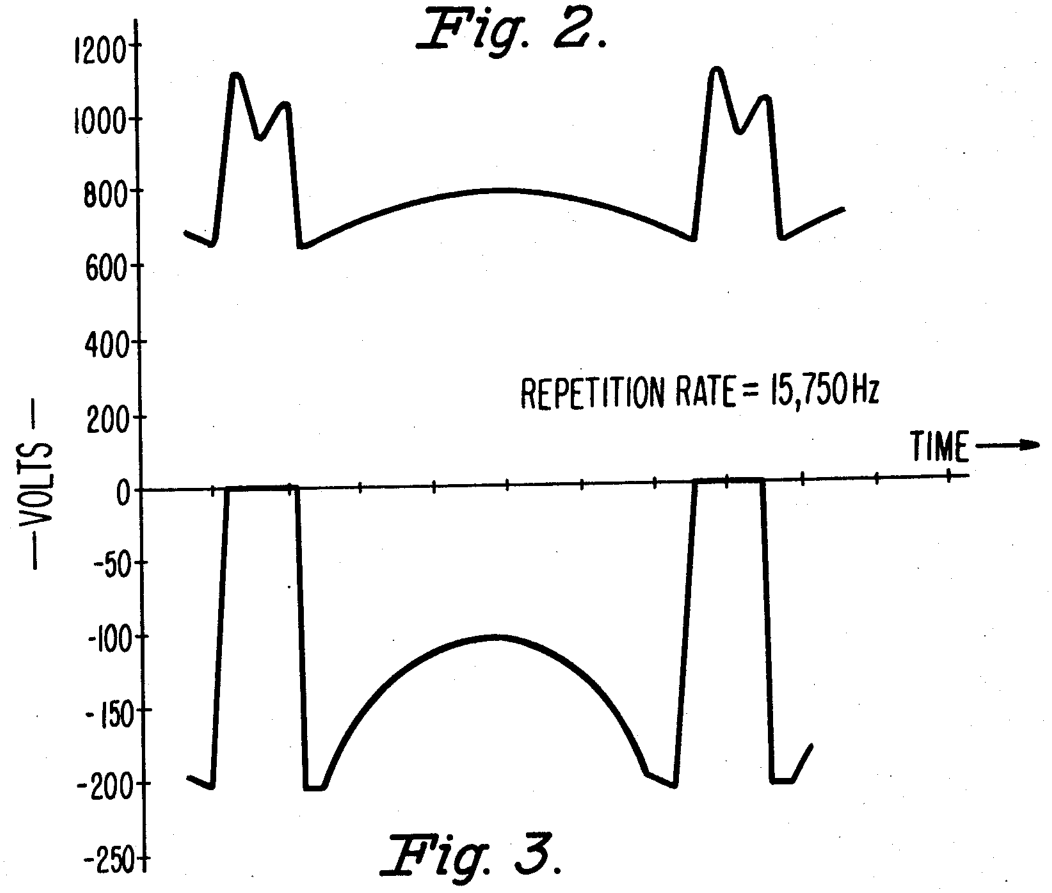
FIGS. 2 and 3 are graphical representations of voltage waveforms present within the hold-down circuit of FIG. 1.

With the illustrated values shown, the waveforms of the voltages developed at the primary winding tap *d* and at the junction of resistor 56 and rectifier 58 are respectively shown in FIGS. 2 and 3. It will be seen that capacitor 52, resistors 54 and 56, and rectifier 58 essentially comprise a clamp circuit to limit the negative excursions of the voltage waveform at tap *d* and the positive excursions at the junction of resistor 56 and rectifier 58. With this arrangement, the equivalent control grid bias circuit for the horizontal oscillator output tube 10 may be simplified, as shown in FIG. 4.

By selecting the values of resistor 62 and capacitor 68 to form a time constant which is longer than the horizontal repetition rate, a direct voltage will be made to appear at the junction of resistor 66 and zener diode 64. By additionally selecting the resistance value of resistor 62 to be much less than the resistance value of resistor 66, the arrangement will be seen to function as a peak detector which provides an output voltage substantially equal to the peak negative value of the voltage developed at the junction of resistor 56 and rectifier 58 less the zener diode reference voltage. Therefore, referring to FIG. 3, if the voltage at the junction of resistor 56 and rectifier 58 extends to −200V, the direct voltage developed at the junction of resistor 66 and zener diode 64 will be of the order of −80V.

Then, if a fault is introduced into the shunt regulator circuit of a type such that high voltage increases could result, it will be seen that the peak-to-peak voltage at tap winding *d* will also tend to increase a proportional amount. The voltage at the junction of resistor 56 and rectifier 58 will correspondingly tend to increase in a negative direction, to cause the resulting direct voltage at the junction of resistor 66 and zener diode 64 to become more negative. This tendency to reduce the conductivity of the horizontal output tube in the presence of such high voltage increases is thus in a direction to offset such changes. In essence, a closed-loop feedback system is afforded to hold the high voltage within limits whenever a failure occurs in the regulator circuit.

It should further be noted that the zener diode 64 is employed to effectively increase the loop gain of this feedback system, as evidenced by the following example. If the high voltage should increase in the presence of regulator failure by some 10 percent, the negative peak voltage developed at the junction of resistor 56 and rectifier 58 will extend to −220V. With only a resistive divider coupling that junction to the end of resistor 66 remote from control grid 12, the direct voltage there developed would then also decrease by this 10 percent, or to −88V. However, with the zener diode 64 present, the voltage at the low end of resistor 66 will be seen to fall to −100V. Thus, the presence of the zener diode 64 will be seen responsible for an additional loop gain of (100−80)/(88−80) or 2.5. It will also be appreciated that rectifier 60 is included to prevent current flow to the grid 12 of the output tube 10 whenever the voltage waveform at the junction of resistor 56 and rectifier 58 extends more positive than the voltage developed at the junction of resistor 66 and zener diode 64, both of which are negative waveforms.

While there has been described what is considered to be a preferred embodiment of the present invention, it will be readily apparent that other modifications may be made by those skilled in the art. Therefore, it is intended that the claims appended hereto be read in light of the spirit and scope of the teachings of this specification.

1. In a color television receiver having an output transformer and a high voltage generation circuit responsive to periodically recurring voltage pulses for developing a unidirectional potential to energize an image reproducing device capable of emitting X-radiation at applied energizing potentials beyond an acceptable limit, the combination comprising:

a high voltage output tube;

regulator means coupled to monitor an indicant of said developed unidirectional potential and to respond to variations in the development thereof to apply a first control signal to said generation circuit to stabilize said potential within a given range of operation; and control means also coupled to monitor an indicant of said unidirectional potential and to respond to variations in the development thereof, but to apply a second control signal to an electrode of said high voltage tube substantially only in response to variations in its monitored indicant which arise when said developed unidirectional potential exceeds the upper limit of its stabilized range, said second control signal being effective to change the operating point of said tube in a direction to re-establish the operating mode of said tube and thereby stabilize said energizing potential below said radiation limit;

said control means being operative to apply its developed signal to said output tube electrode substantially only when said regulator means no longer is operative to stabilize the developed unidirectional potential within said given range of operation, and wherein said control means includes a peak detector having an input electrode coupled to receive voltage pulses developed within said output transformer and an output electrode coupled to vary the bias on said high voltage tube as a function of variations in the amplitude thereof;

wherein said regulator means includes means for providing a relatively fixed positive bias voltage to the control grid electrode of said high voltage tube and wherein said control means provides a negative bias voltage to said control grid electrode which varies as a function of changes in the amplitude of the voltage pulses developed within said output transformer; and wherein a clamp circuit is included to couple the input electrode of said peak detector to said output transformer.

2. The combination of claim 1 wherein said clamp circuit includes a first capacitor and first and second resistors serially coupled between said output transformer and a point of reference potential together with a rectifier coupling the junction between said first and second resistors to said point of reference potential.

3. The combination of claim 2 wherein said peak detector includes a semiconductor rectifier, a third resistor, a zener diode, and a capacitor serially coupled between the junction of said first and second resistors and said point of reference potential, together with a fourth resistor coupling the junction of said zener diode and said further capacitor to the control grid of said high voltage tube.

4. The combination of claim 3 wherein the time constant formed by said third resistor and said further capacitor is substantially longer than the repetition rate of said recurring voltage pulses and wherein the resistance value of said third resistor is substantially less than the resistance value of said fourth resistor.

5. The combination of claim 3 wherein said regulator means includes a vacuum tube having a cathode electrode serially coupled to a point of unidirectional potential by a fifth resistor and a further rectifier, and wherein a sixth resistor is included to couple the junction between said fifth resistor and said further rectifier to said high voltage tube control grid electrode to provide said relatively fixed positive bias voltage thereto.

* * * * *